United States Patent Office
2,772,436
Patented Dec. 4, 1956

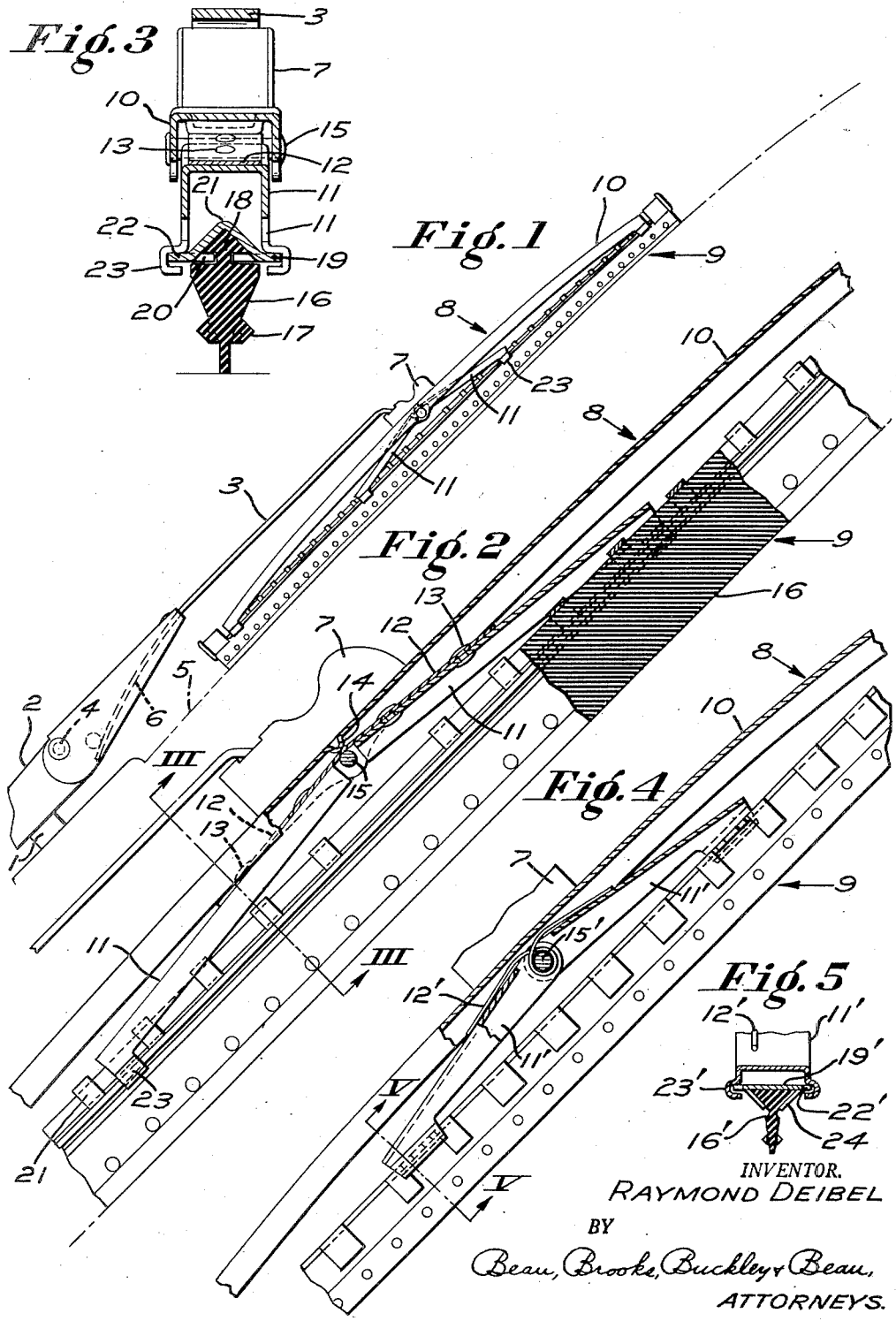

2,772,436

WINDSHIELD WIPER BLADE

Raymond Deibel, Cheektowaga, N. Y., assignor to Trico Products Corporation, Buffalo, N. Y.

Application January 16, 1953, Serial No. 331,540

10 Claims. (Cl. 15—245)

This invention relates generally to the windshield cleaning art, and more particularly to an improved wiper blade primarily adapted for use on curved window glass although equally usable on flat window surfaces.

Many different wiper blade construction designs have been developed in an effort to provide a blade which will conform to a curved window surface and efficiently wipe the same. While some of these prior art wiper blade constructions possess relatively satisfactory wiping characteristics, in many cases they are relatively complicated, expensive and impractical.

Accordingly, the primary object of this invention is to provide a wiper blade adapted for use on curved window surfaces which will effectively distribute arm pressure throughout the length of the wiping edge and which will afford substantial lateral support therefor, while at the same time being relatively simple and compact in construction whereby to provide a relatively inexpensive and highly practical wiper blade.

The foregoing and other objects will become manifest as the ensuing detailed description progresses, reference being made to the accompanying drawing forming a part hereof wherein:

Fig. 1 is a view in side elevation showing the wiper blade of this invention installed in place against a curved window;

Fig. 2 is an enlarged fragmentary view, partly in section, of the blade of Fig. 1;

Fig. 3 is a view in section taken about on line III—III of Fig. 2;

Fig. 4 is a fragmentary view, partly in section, corresponding to Fig. 2 but illustrating a slightly modified construction; and, Fig. 5 is a view in section taken about on line V—V of Fig. 4.

Referring now to the accompanying drawing, numeral 1 designates an oscillatory power shaft on which the wiper actuating arm is carried, said arm comprising an inner mounting section 2 affixed to shaft 1 in a conventional manner and an outer wiper-carrying section 3 pivotally connected to section 2 as by a pin 4 and urged toward the widow surface 5 by a leaf spring 6, all in a known manner. The wiper blade is carried at the outer end of the actuating arm by means of an attaching clip 7, and said blade comprises a holder unit 8 and a squeegee unit 9.

Holder unit 8 comprises a pressure-distributing supporting superstructure assembly including a rigid primary yoke member 10 carrying attaching clip 7 adjacent its mid-point and directly connected adjacent its opposite ends to squeegee unit 9, together with resilient secondary yoke means interposed between primary yoke member 10 and squeegee unit 9 for applying a yielding pressure to the latter at points spaced longitudinally therealong from the primary yoke connections therewith. The secondary yoke means comprises, in the modification of Figs. 1, 2 and 3, rigid lever or link members 11 riveted to a flat leaf spring 12 adjacent their inner ends, as at 13, and connected at their outer or opposite ends to squeegee unit 9. Spring 12 is supported between a detent 14 formed at the mid-point of yoke member 10 and a transverse pin 15 carried at the mid-point of member 10 and spaced slightly beneath detent 14, as clearly shown in Fig. 2, whereby members 11 are in effect pivoted on pin 15 and resiliently bear against squeegee unit 9. While spring 12 may comprise one flat spring member bent slightly adjacent its center, as illustrated in Fig. 2, obviously two separate springs could be used.

With this arrangement, it will be observed that the arm pressure is transmitted and applied directly to the opposite ends of the squeegee unit while being applied resiliently and indirectly to the intermediate portion thereof. By reason of the resiliently mounted secondary yoke means the squeegee unit 9 is permitted to flex in a plane normal to the window surface 5 intermediate its opposite ends and thereby enable the wiping lip thereof to conform to the curvature of said window surface. Also, yoke member 10 is of inverted channel form to nestingly receive members 11.

Figs. 4 and 5 disclose a slightly modified holder unit construction which includes the primary yoke member 10 having its opposite ends directly connected to the opposite ends of the squeegee unit, and a modified secondary pressure-distributing yoke means resiliently mounted and interposed between primary yoke member 10 and the squeegee unit for applying a yielding pressure to the latter at points spaced longitudinally thereof from the primary yoke connections therewith. In this modification, the secondary yoke means comprises link or lever members 11' directly pivotally connected to a transverse pin 15' carried by primary yoke member 10 at its mid-point, and a spiral spring 12' is carried by said pin 15' with its opposite ends bearing downwardly on members 11'. Thus, the construction of this embodiment is but slightly modified from the construction of Fig. 2, and in operation the two embodiments remain the same excepting that the embodiment of Fig. 4, utilizing a spiral spring, possesses an advantage in that there is relatively slight variation in spring pressure upon movement of members 11' to accept conformance of the squeegee unit wiping lip to a curved surface. Also, the rivets 13 of the embodiment of Fig. 2 are dispensed with.

Squeegee unit 9 may be of several known forms utilizing a rubber blade body and a flexible backing strip. For example, in the embodiment of Fig. 2 the squeegee unit comprises a rubber blade body 16 provided along one edge with a wiping lip having laterally extending wiping protuberances adjacent thereto, and provided along its opposite edge with a triangular undercut portion 18. A backing strip 19, centrally formed along its length to alternately provide inwardly extending ears 20 and triangular arched portions 21, is secured along and around the undercut triangular portion 18 of the blade body, as clearly shown in Fig. 3, and is provided with an outwardly extending flange 22 on opposite sides thereof for slidably engaging straddling ears 23 carried adjacent the ends of primary yoke member 10 and adjacent the outer ends of members 11. Also, there is no arched backing strip portion 21 directly beneath pin 15, whereby to avoid any metal-to-metal contact therebetween.

The squeegee unit shown in Fig. 5 comprises a blade body 16' provided with a flat surface opposite its wiping edge, and a backing strip 19' provided with downwardly and inwardly extending straddling ears 24 embraces the blade body 16', as clearly shown in Fig. 5. Backing strip 19' includes outwardly extending shoulders 22' slidably engaging straddling ears 23' carried adjacent the outer ends of members 10 and 11'.

In each instance, means are provided for limiting the relative longitudinal movement between the holder unit and the squeegee unit, such as for example notched backing strip portions embracing one of the straddling ears 23, or a pin fitting between yoke member 10 adjacent one end thereof and the backing strip 19', whereby the holder unit and squeegee unit will not separate and the squeegee unit will be able to flex and conform its wiping lip to the window surface. Of course, either squeegee unit can be used with either holder unit.

With the foregoing constructions, the arm pressure is directly transmitted and applied to the opposite ends of the squeegee unit, and resiliently and indirectly applied to the intermediate portion thereof. Thus, the wiping lip of the squeegee unit is given a firm wiping contact with the window surface adjacent its ends, and a more sensitive wiping pressure, determined by spring means 12 and 12', is applied to the intermediate portion of the wiping lip. In this way, a satisfactory distribution of wiping pressure throughout the length of the wiping lip is obtained.

At the same time, it will be observed that both embodiments of this blade are of relatively simple and inexpensive construction, requiring only one pivot point and one spring element for the secondary yoke means, and in one instance requiring no rivets or the like whatsoever for securing the spring means to the secondary yoke elements. It will be readily appreciated that this provides a relatively compact and highly practical blade requiring a minimum of parts and which is readily assembled.

The foregoing description has been given in detail for purposes of clarity and not by way of limitations since the inventive concept may assume other physical embodiments without departing from the spirit of the invention and the scope of the appended claims.

Having completely disclosed and fully described this invention, and its mode of operation, what is claimed as new is as follows:

1. A wiper blade adapted for use on curved window surfaces comprising a rigid primary yoke member having means for attachment to an actuating arm, resilient secondary yoke means including spring-backed levers having a common pivot on said primary yoke member, and an elongated flexible squeegee unit connected at spaced points therealong to the opposite ends of said primary yoke member and to the ends of said levers.

2. A wiper blade adapted for use on curved window surfaces comprising rigid primary yoke means adapted for attachment to an actuating arm, resilient secondary yoke means including spring-backed levers having a common pivot on said primary yoke means adjacent the longitudinal mid-point thereof, and an elongated flexible squeegee unit connected at longitudinally spaced points therealong to the opposite ends of said primary yoke means and to the ends of said levers.

3. A wiper blade adapted for use on curved window surfaces comprising, a flexible squeegee unit, rigid primary yoke means connected adjacent the opposite ends thereof to said squeegee unit, and resilient secondary yoke means carried by said primary yoke means and connected to said squeegee unit at longitudinally spaced points intermediate the points of connection thereof to said primary yoke means, said secondary yoke means including levers having a common pivot on said primary yoke means, and spring means resiliently urging said levers about their common pivot.

4. A wiper blade adapted for use on curved window surfaces comprising, a flexible squeegee unit, rigid primary yoke means connected adjacent the opposite ends thereof to said squeegee unit, and resilient secondary yoke means carried by said primary yoke means and connected to said squeegee unit at longitudinally spaced points intermediate the points of connection thereof to said primary yoke means, said secondary yoke means including levers having a common pivot on said primary yoke means, and a coiled spring carried by said common pivot and having its opposite ends engaging said levers for resiliently urging the same about their common pivot.

5. A wiper blade adapted for use on curved window surfaces comprising, a flexible squeegee unit, rigid primary yoke means connected adjacent the opposite ends thereof to said squeegee unit, and resilient secondary yoke means carried by said primary yoke means and connected to said squeegee unit at longitudinally spaced points intermediate the points of connection thereof to said primary yoke means, said secondary yoke means including levers having a common pivot on said primary yoke means, and leaf spring means engaging said levers for resiliently urging the same about their common pivot.

6. A wiper blade adapted for use on curved window surfaces comprising, a flexible squeegee unit, rigid primary yoke means connected adjacent the opposite ends thereof to said squeegee unit, and resilient secondary yoke means carried by said primary yoke means and connected to said squeegee unit at longitudinally spaced points intermediate the points of connection thereof to said primary yoke means, said secondary yoke means including a pair of levers, and a unitary leaf spring member fastened to said levers and engaging a pivot on said primary yoke means for resiliently urging said levers about said pivot while supporting the same thereon.

7. A wiper blade adapted for use on curved window surfaces comprising a squeegee unit including an elongated rubber blade body having a wiping edge along one longitudinal margin thereof and a flexible backing strip secured along the opposite margin thereof, and a holder unit for said squeegee unit, said holder unit comprising rigid primary yoke means, resilient secondary yoke means pivoted to said primary yoke means intermediate the opposite ends thereof, said secondary yoke means including independently movable lever means having a common pivot and spring means resiliently urging said lever means in opposite directions about said pivot, and means slidably connecting one end of said primary yoke means and both ends of said secondary yoke means to said backing strip for free sliding movement therebetween, the other end of said primary yoke means being secured to said backing strip for limited relative movement therebetween.

8. A wiper blade adapted for curved window surfaces comprising a flexible squeegee unit, and a holder unit therefor including primary pressure-distributing means bridging said squeegee unit and connected thereto adjacent the opposite ends thereof, secondary pressure-distributing levers having a common pivot on said primary pressure-distributing means and connected to said squeegee unit at spaced points intermediate its points of connection to said primary pressure-distributing means, and spring means resiliently urging said levers about their pivot.

9. A wiper blade adapted for curved window surfaces comprising, a flexible squeegee unit, and a holder unit therefor comprising, first pressure-distributing means spanning a major portion of the length of said squeegee unit, second pressure-distributing means spanning a minor portion of the length of said squeegee unit, one of said first and second pressure-distributing means comprising a rigid member connected adjacent its opposite ends to said squeegee unit and the other thereof comprising a pair of levers having a common pivot on said one thereof and connected adjacent their outer ends to said squeegee unit, and spring means resiliently urging said levers about their pivot.

10. A wiper adapted for curved window surfaces comprising, a squeegee unit, and a holder unit therefor adapted for attachment to an actuating arm comprising, rigid pressure-distributing yoke means connected adjacent the opposite ends thereof to said squeegee unit, and resilient pressure-distributing yoke means, said resilient yoke means including spring-backed levers having a common pivot adjacent one end thereof on said rigid yoke means adjacent the longitudinal midpoint thereof and connected adjacent their other ends to said squeezee unit.

References Cited in the file of this patent

UNITED STATES PATENTS

| | | |
|---|---|---|
| 1,183,463 | Jepson | May 16, 1916 |
| 2,548,090 | Anderson | Apr. 10, 1951 |

FOREIGN PATENTS

| | | |
|---|---|---|
| 820,156 | France | July 1937 |
| 995,933 | France | of 1951 |